Nov. 1, 1927.

H. K. WHEELOCK

VULCANIZING APPARATUS

Filed Jan. 3, 1927

1,647,596

INVENTOR.

Herbert K. Wheelock,

BY Fay, Oberlin & Fay,

ATTORNEYS.

Patented Nov. 1, 1927.

1,647,596

UNITED STATES PATENT OFFICE.

HERBERT K. WHEELOCK, OF AKRON, OHIO.

VULCANIZING APPARATUS.

Application filed January 3, 1927. Serial No. 158,508.

This invention relates as indicated to a vulcanizing apparatus. More particularly it comprises an apparatus for supporting a tire casing undergoing repairs with means for stretching bandages secured about such casing combined with spring tensioning devices which serve to take up any stretch which may develop on such bandages.

The present practice with similar repair apparatus has been to provide manually controllable means for maintaining tension upon the bandages, but such devices require constant attention, and the failure to maintain the tension at times will result in an imperfect cure.

The principal object of the present invention is to provide an improved apparatus for producing tire casing repairs. Another object of the invention is to provide an apparatus having means for applying tension to the tire bandages and for maintaining such tension notwithstanding the stretching of such bandages in the course of the vulcanizing or rubber curing operation. Other and further objects of the invention will appear in the course of the following description. To the accomplishment of the foregoing and related ends, said invention, then consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
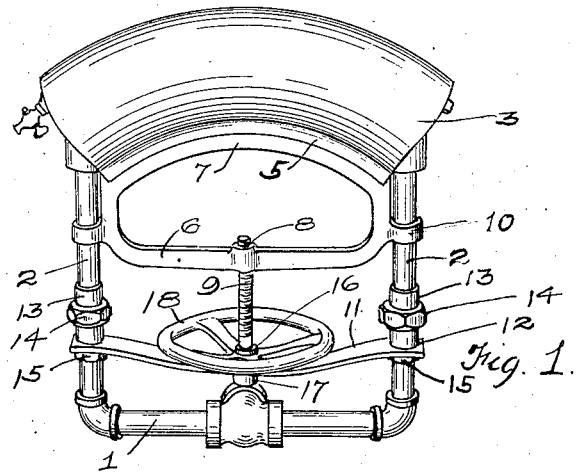
Figure 3:
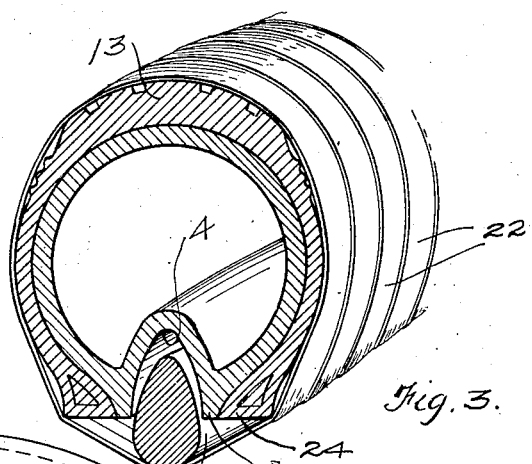
Figure 2:
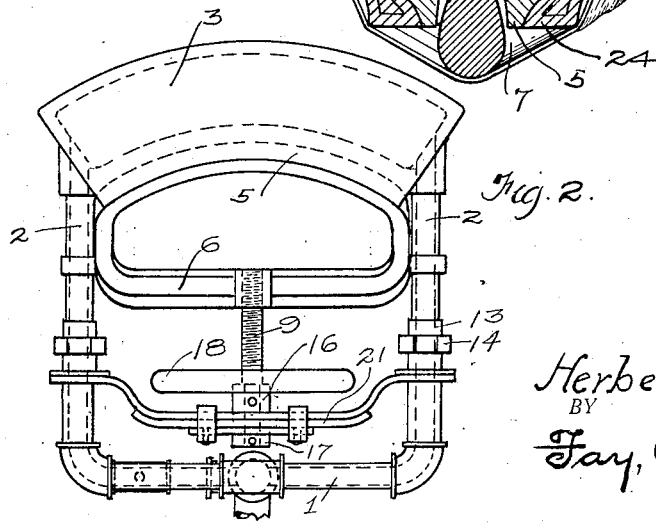

In said annexed drawing:

Fig. 1 is a front elevation of a device embodying the principle of my invention; Fig. 2 is a view similar to Fig. 1, showing a modified form of construction; and Fig. 3 is a fragmentary perspective view partly in section showing the relation of the tire bandages to the tensioning device.

As is clearly shown in Fig. 1 of the drawing, the apparatus comprises a U-shaped tubular frame 1 across the upper ends of the side arms 2 of which a steam arm 3 is connected, with bandage stretching means positioned beneath said steam arm.

The steam arm is preferably arcuate in shape, and is provided on its under side with a recess or depression 4, having projecting flanges 5 at either edge. A tension bar 6 in the form of an open loop is provided having its upper portion 7 conforming in curvature to the under side of the steam arm, and adapted to be received within said recess between said flanges. This upper portion is preferably of oval cross-section as shown in Fig. 3 with its narrower edge on the upper side. Guide members 10 are formed at each side of said tensioning bar, to engage about the side arms of the U-shaped frame. Centrally of the lower portion of the loop of the tension bar, a screw-threaded aperture 8 for a tensioning screw 9 is provided.

A leaf spring 11, provided with apertured ends 12 engaging over the side arms is secured in any desired position of adjustment by means of collars 13 and clamping nuts 14, 15, adjacent the lower portion of the frame. Said spring is centrally apertured to receive the lower end of the tensioning screw which is rotatably held therein by means of collars 16, 17, on either side of the spring. A hand wheel 18 is secured to the tensioning screw immediately above the leaf spring. The upper end of the tensioning screw is engaged through the threaded aperture in the lower portion of the tensioning bar and will serve to move the same toward or away from the steam arm according to the direction of rotation of said screw.

As the tension bar is moved downwardly, the tension on the bandages about the tire and said bar is increased and the resiliency of the leaf spring is brought into play. When the proper amount of tension is applied, the leaf spring will have a slight excess of tension stored within the same so that upon the stretching of the bandages, such tension will not be altogether relieved.

In the form of construction shown in Fig. 2, a built-up leaf spring 21 is illustrated, the construction otherwise being substantially like that shown in Fig. 1.

The application of the bandages 22 about the tire, steam arm, and tensioning bar is illustrated in Fig. 3. The apparatus not only permits pressure to be applied directly to the tread 23, but also to the beads 24, inasmuch as the tension bar is received into a recess between the extensions of the steam arm against which the beads rest and the bandages closely follow the contour of the tire. When the tension is applied in a downward direction, the bandages are moved inwardly as well as downwardly, thus holding the tread, side walls and the beads close to the steam arm.

When the wheel applying the tension is turned to the required extent, no further tensioning of the apparatus is necessary until the cure has been completed, the spring automatically taking up tension as the bandage is stretched.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. An apparatus of the character described, having in combination a heated arm, a frame supporting said arm, tensioning means adapted to be moved toward and away from said arm, and resilient means adapted to be placed under constant tension to draw said tensioning means from said arm.

2. An apparatus of the character described, having in combination a heated arm, a frame supporting said arm, tensioning means guided by said frame and adapted to be moved toward and away from said arm, and resilient means adapted to be placed under constant tension to draw said tensioning means from said arm.

3. An apparatus of the character described, having in combination a steam arm, a frame supporting said steam arm, a tension bar guided by said frame and adapted to be moved toward and away from said steam arm, and resilient means mounted on said frame adapted to be placed under constant tension to draw said tension bar from said steam arm.

4. An apparatus of the character described having in combination a heated arm having a recess on its under side, a tension bar having a portion adapted to enter said recess, and flexible means adapted to hold a tire casing upon said heated arm and engaged over said tension bar, whereby downward and inward pressure is applied to the tread side walls and beads of said tire casing.

5. An apparatus of the character described having in combination a heated arm having a recess on its under side, a tension bar having a portion adapted to enter said recess, flexible means adapted to hold a tire casing upon said heated arm and engaged over said tension bar, and resilient means adapted to be placed under constant tension to draw said flexible means and the enclosed portion of the tread side walls and beads of the tire casing downwardly and inwardly into close contact with said heated arm.

Signed by me this 25th day of August, 1926.

HERBERT K. WHEELOCK.